United States Patent
Dewey

(10) Patent No.: US 8,966,635 B2
(45) Date of Patent: Feb. 24, 2015

(54) SOFTWARE MODULE OBJECT ANALYSIS

(75) Inventor: David Bryan Dewey, Milton, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 13/404,572

(22) Filed: Feb. 24, 2012

(65) Prior Publication Data

US 2013/0227693 A1 Aug. 29, 2013

(51) Int. Cl.
*G06F 9/44* (2006.01)

(52) U.S. Cl.
CPC ...... *G06F 9/44* (2013.01); *G06F 8/75* (2013.01)
USPC .............. 726/25; 712/225; 717/123; 717/126

(58) Field of Classification Search
CPC ............. G06F 11/00; G06F 9/35; G06F 8/75; G06F 9/44; G06F 9/3004; H04N 1/32454; H04N 21/26233
USPC ............................................ 726/25; 712/225
See application file for complete search history.

(56) References Cited

U.S. PATENT DOCUMENTS

| | | | | |
|---|---|---|---|---|
| 5,793,374 A | * | 8/1998 | Guenter et al. | 345/426 |
| 6,128,775 A | * | 10/2000 | Chow et al. | 717/156 |
| 6,374,286 B1 | * | 4/2002 | Gee et al. | 718/108 |
| 6,681,385 B1 | * | 1/2004 | Steensgaard et al. | 717/133 |
| 6,721,941 B1 | * | 4/2004 | Morshed et al. | 717/127 |
| 6,754,809 B1 | * | 6/2004 | Guttag et al. | 712/225 |
| 6,760,903 B1 | * | 7/2004 | Morshed et al. | 717/130 |
| 6,779,114 B1 | * | 8/2004 | Chow et al. | 713/189 |
| 6,782,478 B1 | | 8/2004 | Probert | |
| 6,925,638 B1 | * | 8/2005 | Koved et al. | 717/155 |
| 7,133,846 B1 | * | 11/2006 | Ginter et al. | 705/54 |
| 7,263,532 B2 | * | 8/2007 | Steensgaard et al. | 1/1 |
| 7,502,967 B1 | * | 3/2009 | Li et al. | 714/38.14 |
| 7,516,449 B2 | | 4/2009 | Agrawal | |
| 7,735,073 B1 | * | 6/2010 | Kosche et al. | 717/158 |
| 7,769,974 B2 | * | 8/2010 | Bhansali et al. | 711/170 |
| 8,327,327 B2 | * | 12/2012 | Bierhoff et al. | 717/116 |
| 8,364,910 B2 | * | 1/2013 | Wilkerson et al. | 711/152 |
| 8,516,443 B2 | * | 8/2013 | Li et al. | 717/123 |
| 8,732,669 B2 | * | 5/2014 | Valdiviezo Basauri et al. | 717/126 |
| 2001/0044856 A1 | * | 11/2001 | Agesen et al. | 709/315 |
| 2002/0019716 A1 | * | 2/2002 | Agesen et al. | 702/83 |
| 2002/0038301 A1 | * | 3/2002 | Aridor et al. | 707/10 |
| 2002/0095453 A1 | * | 7/2002 | Steensgaard | 709/107 |
| 2004/0143739 A1 | * | 7/2004 | de Jong | 713/176 |
| 2005/0081192 A1 | * | 4/2005 | DeLine et al. | 717/126 |
| 2006/0130021 A1 | * | 6/2006 | Plum et al. | 717/140 |
| 2006/0278697 A1 | * | 12/2006 | Lovett | 235/380 |
| 2007/0067758 A1 | * | 3/2007 | Findeisen et al. | 717/140 |
| 2007/0156967 A1 | * | 7/2007 | Bond et al. | 711/137 |
| 2007/0283105 A1 | * | 12/2007 | Kalogeropulos et al. | 711/154 |
| 2009/0064099 A1 | * | 3/2009 | Foley | 717/110 |

(Continued)

OTHER PUBLICATIONS

Ruf, "Context-Insensitive Alias Analysis Reconsidered", 1995.*

(Continued)

*Primary Examiner* — O. C. Vostal
(74) *Attorney, Agent, or Firm* — Hewlett-Packard Patent Department

(57) ABSTRACT

In one implementation, an object analysis system identifies an object within a software module, and determines a size of the object based on at least one operation within the software module. The object analysis system identifies the object and determines the size of the object without reference to source code of the software module.

19 Claims, 4 Drawing Sheets

(56) References Cited

U.S. PATENT DOCUMENTS

| | | | |
|---|---|---|---|
| 2009/0144561 | A1 | 6/2009 | Davidson et al. |
| 2009/0249289 | A1* | 10/2009 | Akritidis et al. ............... 717/108 |
| 2009/0300658 | A1* | 12/2009 | Morris et al. ................. 719/321 |
| 2010/0086200 | A1* | 4/2010 | Stankiewicz et al. ......... 382/154 |
| 2010/0214284 | A1* | 8/2010 | Rieffel et al. ................. 345/419 |
| 2010/0333201 | A1* | 12/2010 | Haviv et al. ...................... 726/22 |
| 2011/0007942 | A1* | 1/2011 | Audet et al. .................. 382/103 |
| 2011/0055261 | A1* | 3/2011 | Makkar et al. ................ 707/770 |
| 2011/0145503 | A1* | 6/2011 | Erez et al. ..................... 711/125 |
| 2011/0179347 | A1* | 7/2011 | Proctor et al. ................ 715/234 |
| 2012/0143808 | A1* | 6/2012 | Karins et al. ................... 706/46 |
| 2012/0151184 | A1* | 6/2012 | Wilkerson et al. .............. 712/36 |
| 2012/0151461 | A1* | 6/2012 | Odaira .......................... 717/156 |
| 2012/0159619 | A1* | 6/2012 | Berg et al. ....................... 726/22 |
| 2012/0216276 | A1* | 8/2012 | Regnault et al. ................ 726/16 |
| 2012/0304153 | A1* | 11/2012 | Li et al. ......................... 717/123 |
| 2013/0031531 | A1* | 1/2013 | Keynes et al. ................. 717/126 |
| 2013/0055207 | A1* | 2/2013 | Cui et al. ....................... 717/125 |
| 2013/0111449 | A1* | 5/2013 | Haviv et al. ................... 717/126 |
| 2013/0210653 | A1* | 8/2013 | Pregibon et al. .................. 506/9 |

OTHER PUBLICATIONS

Xu et al., "Automatic Diagnosis and Response to Memory Corruption Vulnerabilities", 2005.*

Chinchani et al., "A Fast Static Analysis Approach to Detect Exploit Code Inside Network Flows", 2006.*

Weber et al., "Enhancing software safety by fault trees: experiences from an application to flight critical software", 2004.*

Chen et al., "Defeating Memory Corruption Attacks via Pointer Taintedness Detection", 2005.*

Wang et al., "Protection of Software-based Survivability Mechanisms", 2001.*

Brumley, David, Analysis and Defense of Vulnerabilities in Binary Code [online], School of Computer Science, Carnegie Mellon University, Sep. 29, 2008 [retrieved on Feb. 24, 2012], Retrieved from the Internet: < http://reports-archive.adm.cs.cmu.edu/anon/2008/CMU-CS-08-159.pdf >.

Skevoulis, S. et al., Generic Invariant-Based Static Analysis Tool for Detection of Runtime Errors in Java Programs, Proceedings of 37th International Conference on Technology of Object-Oriented Languages and Systems, 2000, pp. 36-44.

* cited by examiner

SOFTWARE MODULE OBJECT ANALYSIS

BACKGROUND

Object-oriented programming languages and techniques allow application (or software) developers to manage complexity of application development by encapsulating related properties and functionalities in objects. Such programming languages and techniques can simplify application development, maintenance, and extension.

Typically, object-oriented constructs such as classes from which objects are generated are expressed in the syntax and grammar of high-level object-oriented programming languages, but not in binary (or machine) executable code that is interpreted by a processor. As such, binary (or executable) code generated when source code that defines an application (or software library) and is expressed in an object-oriented programming language is compiled does not include syntactic identification of objects. In other words, explicit identification of object-oriented constructs expressed in high-level object-oriented programming languages is lost during the compilation process.

DETAILED DESCRIPTION

Figure 1A:
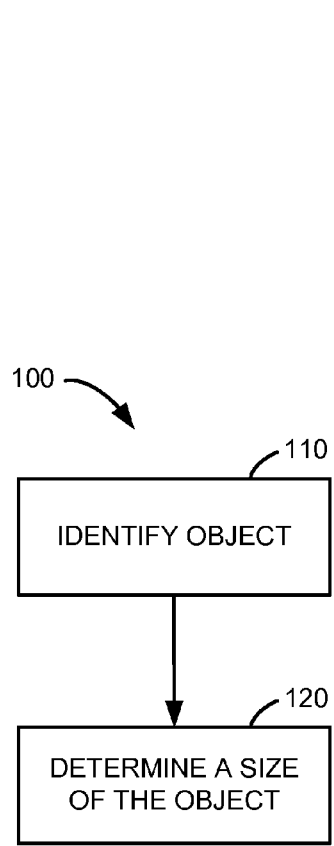
FIG. 1A is a flowchart of a process to analyze an object within a software module independent of source code, according to an implementation.

Because explicit identification of object-oriented constructs expressed through the syntax of high-level object-oriented programming languages is lost during compilation to binary code (e.g., translation of a source code definition or representation of an application to a binary code definition or representation of the application such as a machine code or byte-code definition), potential security vulnerabilities can be obscured during static analysis of the resulting binary code. For example, because information about an object (e.g., the class on which the object is based, the size of the object, the number and types or sizes of properties of the object, and the number of functionalities accessible to the object via a dispatch table) is typically not expressed in binary code, determining whether indirect operations relative to the object expose security vulnerabilities can be difficult without the source code from which the binary code was generated. As a specific example, an indirect operation can result in arbitrary code execution security vulnerabilities if the binary code does not include run-time validation to ensure that the indirect operation does not operate outside or beyond the object (i.e., at memory addresses not allocated to or shared by the object).

Some binary code representations of applications, however, do include information about objects. Such information can be included in binary code as run-time type information (RTTI) or debugging information that is compiled into the binary code. Nevertheless, because the binary code representations of many applications do not include such information (e.g., to discourage reverse engineering of these applications), robust methodologies and systems for analyzing binary code based on (or derived from) source code using object-oriented techniques should not assume availability of such information.

Implementations discussed herein analyze operations described in binary code to identify objects based on those operations. Said differently, implementations discussed herein reconstruct, at least partially, objects (or representations of objects) by inferring the structure of such objects based on operations described in binary code. Thus, implementations discussed herein can identify objects and attributes such as a size thereof without referring to (or independent of) source code or explicit information about such objects which may or may not be included in the binary code.

Furthermore, implementations discussed herein perform security vulnerability analyses of binary code representations of applications using such objects. For example, implementations discussed herein can identify security vulnerabilities such as type confusion vulnerabilities that can result in arbitrary code execution, code injection, application failure, or other undesirable or unintended behavior of an application using information about objects identified by analysis of operations described in binary code.

As used herein, the term "software module" refers to a group of code representing instructions that can be executed at a computing system or processor to perform some functionality. Applications, software libraries (e.g., statically-linked libraries or dynamically-linked libraries), and application frameworks are examples of software modules. Additionally, as used herein, the terms "operations described in binary code" and "operations defined in binary code" and similar terms or phrases refer to operations described by code representing instructions that exist in a binary code representation (or binary representation) of a software module. In some implementations discussed herein, operations described in binary code are analyzed (e.g., parsed and interpreted) in a representation other than a binary code representation of a software module. For example, an object analysis system can analyze operations described in binary code using an intermediate representation of a software module derived from a binary code representation of that software module. Accordingly, implementations discussed herein with reference to analysis of operations described in binary code should be understood to refer to analysis of those operations using a binary code representation of a software module or a representation of the software module derived from the binary code representation.

FIG. 1A is a flowchart of a process to analyze an object within a software module independent of source code, according to an implementation. Process 100 can be implemented, for example, at an object analysis system hosted at a computing system such as a desktop computer, a workstation computer, or a notebook or laptop computer. Moreover, process 100 is performed statically on a representation (e.g., a binary code representation or other representation) of a software module. That is, process 100 is a static analysis process. In other words, process 100 is performed by parsing the representation of the software module, rather than by observing the effects of the software module during run-time within an environment such as a computing system.

At block 110, an object is identified based on operations described in a binary code representation of a software module (or operations described in binary code) without reference to source code of the software module. As discussed above, the object can be identified by analyzing, for example, a binary code representation itself, or a representation derived from the binary code representation.

As a specific example, the object can be identified based on operations described in binary code that result in instantiation of an object. Instantiation of an object refers to a process by which an object begins to exist within a run-time environment. Because an object begins to exist at run-time within a software module when instantiated, identifying instantiation of an object allows an object analysis system implementing process 100 to track the use of an object within that software module.

An object can be instantiated, for example, by allocating memory (e.g., a number of memory locations beginning at a particular memory address within a memory or memory system of a computing system) to that object. As more specific examples, an object can be instantiated in memory that is allocated at a stack of a run-time environment for a software module (e.g., by executing one or more operations at a processor to move a stack pointer by a number of memory locations related to a size of the object), or at a heap of the run-time environment (e.g., by executing one or more operations at a processor to request a number of memory locations related to a size of the object). Accordingly, operations that effect allocations of memory at run-time of the software module can be interpreted at block 110 to identify an object.

Typically, the operations that are executed to instantiate an object at run-time also provide an identifier of (or reference to) the object. For example, the identifier of the object can be a memory address at which memory was allocated for the object. Because memory can be allocated dynamically during run-time of a software module, in some implementations, a memory address or other identifier of an object is not specified in the binary code representation of a software module. Rather, operations described in the binary code reference a variable (e.g., include a memory address of the variable as an operand) at which that identifier will be stored during run-time.

A variable within a memory is a memory location at which one or more values can be stored. Such a memory location can be at a processor memory (e.g., a register or cache), at a system memory (e.g., a Random Access Memory (RAM) of a computing system), or at some other memory. Operations within binary code that operate on such variables can refer to a memory address (either absolute or relative to another memory address such as an offset from a stack pointer) of that memory location. Thus, the identifier (e.g., memory address) of an object can be stored as a value at a memory location with a memory address that is used by operations within the binary code. Accordingly, as used herein, terms such as "identifier of an object" and "memory address of an object" should be understood to refer to the identifier (e.g., memory address) itself or to a variable at which a value representing the identifier is stored. As more specific examples of identifying operations that result in allocation of memory for objects at block 110, an object analysis system implementing process 100 can identify operations such as modifications to a stack pointer to allocate memory on a stack for an object, calls to memory allocation subroutines (or functions), or calls to instantiation subroutines (e.g., calls to the new operator in C++) based on identifiers or characteristics of such calls such as a mangled name. A call is an operation within binary code that, when executed, causes a processor to access instructions at a memory address other than the next sequential memory address to the memory address at which the current instruction for the processor is located. As examples, a call can be a jump operation or a subroutine call operation. As another example of identifying an object at block 110 an object analysis system implementing process 100 can identify operations such as allocation of memory and a call that includes the memory address at which the memory allocation occurred as an argument and is subsequent (either immediately subsequent or follows operations to set up a call stack for the call) to the memory allocation. This pattern is characteristic of instantiation of an object in a binary code representation of a software module that was developed using the C++ programming language, where the call is a call to a constructor of the object. The memory address can then be used to track use of the object by operations within the binary code. That is, operations performed using the memory address (directly or indirectly using relative offsets from the memory address) can be said to be operations applied to the object. Said differently, operations within the binary code that use the memory address as an operand are performed on the object. Thus, an object analysis system implementing process 100 can monitor use of the object by monitoring use of an identifier such as a memory address associated with instantiation of the object.

As yet another example of identifying an object at block 110, an object analysis system implementing process 100 can identify operations such as data store operations to store a reference to a dispatch table within a block of allocated memory. A dispatch table is a group of references (or pointers) to subroutines such as functions, and is commonly used for late binding of subroutines to an object. For example, in some software modules developed using the C++ programming language, a dispatch table (referred to as a virtual table or vtable) is used to bind virtual functions to an object at run-time. More specifically, an object implementing virtual functions includes a reference to a memory address of a dispatch table that includes references to the virtual functions (or memory addresses at which the virtual function are defined) for that object. In some implementations, a reference to a memory address is referred to as a pointer because the reference "points to" a memory location with that memory addresses. The virtual functions can be called indirectly by accessing the dispatch table pointer using an offset from a memory address of the object and an offset to each virtual function pointer within the dispatch table. Thus, object analysis system implementing process 100 can identify a block of allocated memory as an object if that block of allocated memory includes a pointer to a dispatch table.

A size of the object is then determined at block 120. Similar to block 110, a size of the object is determined at block 120 by analyzing operations defined within binary code (or a binary representation of a software module). For example, operations that are applied to a memory address of an object, relative to the memory address of the object, or at a memory location or group of memory locations near a memory location described or reference by the memory address of the object (i.e., memory location near a representation of the object within a memory) can be analyzed to determine a size of the object.

The size of an object can be any of a variety of sizes associated with the object. For example, the size can be a number of bytes allocated at a memory to the object. As another example, the size can be the number of bytes or function references at a dispatch table associated with an object.

Figure 1B:
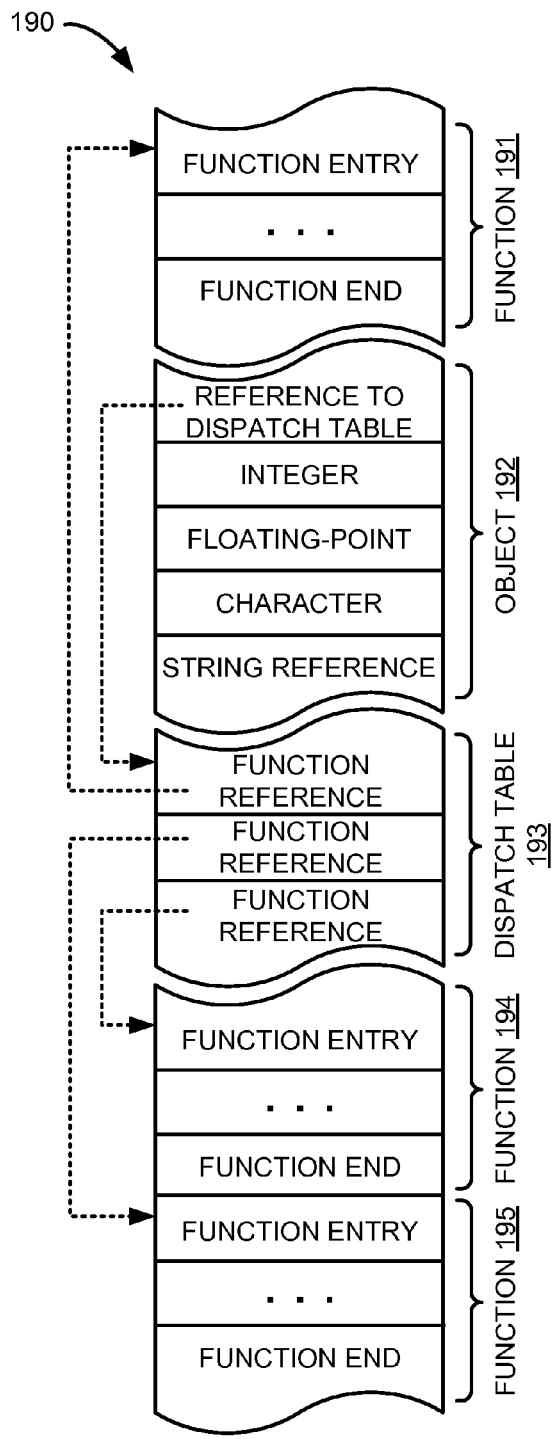
FIG. 1B is a representation of an object within a memory, according to an implementation.

As a visual example of an object, FIG. 1B is a representation of an example object within a memory, according to an implementation. FIG. 1B includes memory 190 with memory locations at which function 191, object 192, dispatch table 193, function 194, and function 195 are stored. Function 191 and object 192 are separated by memory locations of memory 190 that are not shown in FIG. 1B; object 192 and dispatch table 193 are separated by memory locations of memory 190 that are not shown in FIG. 1B; dispatch table 193 and function 194 are separated by memory locations of memory 190 that are not shown in FIG. 1B; and function 194 and 195 are contiguous in memory 190.

Object 192 includes a reference (or pointer variable) to dispatch table 193, an integer variable (i.e., a variable at which integer values can be stored), a floating-point variable (i.e., a variable at which floating-point values can be stored), a character variable (i.e., a variable at which Unicode character values can be stored), and a string reference (or pointer) variable (i.e., a memory address of a group of ASCII characters). These variables are referred to herein as the properties of object 192.

In some implementations, a size of object 192 can be the number of bytes of memory 190 used or occupied by the pointer variable, the integer variable, the floating-point variable, the character variable, and the string pointer collectively. As a specific example, if the pointer variable, integer variable, floating-point variable, and string pointer variable are each four bytes, and the character variable is two bytes; a size of object 192 is 18 bytes.

In the example illustrated in FIG. 1B, the reference to dispatch table 193 is a pointer to the first memory location of memory 190 occupied by a function reference (or function pointer) of dispatch table 193. Dispatch table 193 includes function references (or pointers) to functions 191, 194, and 195. In other words, dispatch table 193 include three function pointer variables, each of which stores a memory address of the entry point of one of functions 191, 194, and 195. In some implementations, a size of object 192 can be three, the number of function pointers stored at dispatch table 193 referenced by object 192. In some implementations, each function pointer of dispatch table 193 can occupy four bytes of memory 190, and a size of object 192 can be 12, the number of bytes at dispatch table 193 referenced by object 192.

Referring again to FIG. 1A, an object analysis system implementing process 100 can determine a size of the object at block 192 using a variety of methodologies. For example, an object analysis system can identify a size of an object based on zero padding of (e.g., near) that object. As a specific example, an object analysis system can identify operations that result in null or zero padding (or zero padding operations) at memory locations near the object based on a memory address of the object and memory address at which null or zero values will be stored during runtime when the zero padding operations are executed. As another specific example, an object analysis system can identify groups of zero values (e.g., groups of bytes, words, double-words, or quad-words with zero or null value) within a representation of the software module. The size of the object can be determined by finding the difference between the memory address of the object and a memory address at which zero padding will be applied when the software module is executed (e.g., one or more zero padding operations of the software module are executed at a processor) at run-time.

As another example, an object analysis system can determine a size of the object by identifying data store operations to store function pointers at a dispatch table referenced by the object and other data store operations that store data other than function pointers near the dispatch. More specifically, the object analysis system can identify a memory address of a dispatch table (e.g., at which a dispatch table begins) based on an operation that stores a pointer to the dispatch table at an object. The object analysis system can then identify operations that store function pointers at memory addresses near the memory address of the dispatch table, and other operations that store data other than function pointers at memory addresses near the memory address. The size of the object (here, the size of the dispatch table associated with the object) can be determined by finding the difference between the memory address of the dispatch table and a memory address at which data other than a function pointer will be stored when a those operations are executed at run-time. Thus, a size of the object can be the number of function pointer variables in the dispatch table or the number of bytes occupied by the dispatch table.

As yet another example of determining a size of an object, an object analysis system can identify and catalog each unique offset value from the memory address of the object used by data access operations within binary code of a software module. Each unique offset value from the memory address of the object can identify a property of the object. In other words, to access a property of an object, a data store operation can include as operands the memory address of the object and an offset to that property. Moreover, the object analysis system can determine based on the operations for which the memory address of the object and unique offset values are operands a size of each property of the object. For example, typically, operations defined within binary code explicitly or implicitly define a size for the operations such as, for example, a number of bits or bytes which the operation—when executed by a processor—manipulates or utilizes. Thus, an object analysis system can determine a size of the object by identifying the properties of the object, identifying the sizes of those properties, and summing the sizes of those properties.

Similarly, an object analysis system can identify and catalog each unique offset value from the memory address of a dispatch table referenced by the object used by operations within the binary code. Each unique offset value from the memory address of that dispatch table can be a function pointer for the object as discussed above in relation to FIG. 1B. Moreover, the object analysis system can determine based on the operations for which the memory address of that dispatch table and unique offset values are operands a size of each function pointer. Alternatively, the function pointers can be of a predetermined (e.g., known or assumed based on, for example, a computer system architecture compatible with the representation of the software module) size. Thus, an object analysis system can determine a size of the object by identifying a dispatch table associated with the object, identifying the number of function pointers within that dispatch table, identifying the sizes of those function pointers, and summing the sizes of those function pointers.

Moreover, as yet another example, an object analysis system can determine a size of an object based on one or more data access operations that are not associated with the object. For example, an object analysis system can identify which memory locations are accessed (e.g., read, written to, or manipulated) by operations defined in the binary code without reference to (or independent of) the memory address of the object or to a memory address of a dispatch table associated with the object. In other words, an object analysis system can assume that properties of an object are accessed by operations in the binary code using offsets from a memory address of the object. Thus, memory locations that are accessed independent of (or without reference to) the memory address of the object can be assumed to not store properties of the object, and, therefore, to not be part of the object. Similarly, memory locations that are accessed independent of (or without reference to) the memory address of a dispatch table associated with the object can be assumed to not store function pointers for function of the object, and, therefore, to not be part of the object (or that dispatch table). Said differently, operations that are independent of the object or dispatch table can be assumed to store data that is unrelated to the object.

Accordingly, an object analysis system can use the memory addresses of memory locations that are accessed independent of the memory address of the object or a dispatch table to determine the bounds of the object or the dispatch table. That is, the object analysis system can determine a size of the object by finding a difference between a memory address of the object (or a dispatch table of the object) and memory addresses near that memory address that are operands to operations that do not include (explicitly or implicitly) the memory address of the object (or an associated dispatch table) as an operand.

Furthermore, as another example, an object analysis system can determine the size of an object based on the amount of memory allocated to the object. More specifically, for example, an operation within binary code can store a value identifying a number of bytes that should be allocated for the object during instantiation of the object at processor register or at a stack of a run-time environment prior to a call to a memory allocation subroutine or function. Alternatively, for example, binary code can include an operation to modify a stack pointer by number of bytes to allocate memory for the object. An object analysis system can parse, at block 120, operations related to the instantiation of the object identified in block 110 to identify the number of bytes allocated to the object, and that number of bytes can be a size of the object.

In some implementations, various methodologies such as those discussed above or other methodologies can be combined to determine a size of an object. Additionally, in some implementations, multiple sizes of (or associated with) the object such as, for example, a number of bytes occupied at a memory by the properties of the object and the number of bytes occupied by a dispatch table associated with the object can be determined at block 120. Furthermore, process 100 illustrated in FIG. 1A is an example implementation. Other implementations can include additional or different blocks or steps, for example, as discussed in more detail herein.

Figure 2:
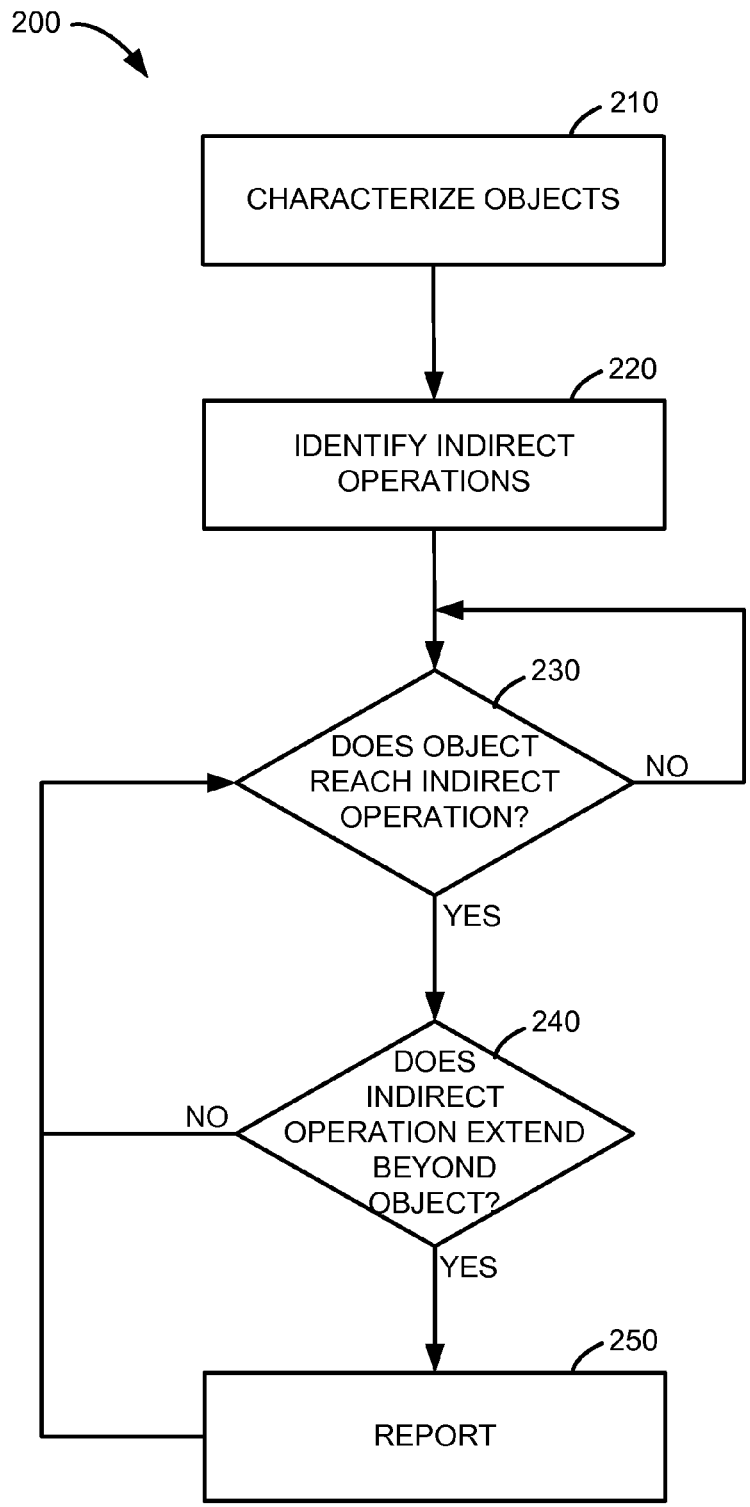
FIG. 2 is a flowchart of a process to analyze an object independent of source code, according to an implementation.

FIG. 2 is a flowchart of a process to analyze an object independent of source code, according to an implementation. As discussed above, information about objects such as an identifier of each object (or a variable at which such an identifier is stored during run-time of a software module) used to identify or reference that object by operations defined within a binary code representation of an software module and a size of each object can be used to perform security vulnerability analysis of that software module. Because such information about the objects can be derived from the operations defined within a binary code representation of the software module, the analyses discussed herein can be performed without access to source code of the software module or debugging information that may or may not be included in the binary code representation of the software module.

As illustrated in FIG. 2, objects within a software module are characterized at block 210. The objects can be characterized as discussed above in FIG. 1A. That is, for example, the objects can be characterized by determining for each object an identifier used by operations within binary code to reference that object and a size of that objects.

Indirect operations defined within the binary code are then identified at block 220. Indirect operations are operations that accept or have as an operand a reference (or pointer), offset, or combination thereof that points to data. Rather than operate on or with that reference and/or offset, indirect operations (or a processor executing indirect operations) operate of the data to which that reference or offset points (or refers). An operation can be identified as indirect explicitly (e.g., based on operation or machine code identifiers) or implicitly (e.g., based on syntax or operands of the operation). In other words, an object analysis system can interpret operations described in binary code to determine which operations are indirect operations. Indirect operations are identified at block 220 to identify potential security vulnerabilities in a software module.

Security vulnerabilities can arise from indirect operations, for example, when no verification is made a run-time that the data that is the subject of the operation is valid data for the operation. As an example, a software module can have two objects: object A and object B. Object A has two properties: a pointer variable that points to a dispatch table with two function pointers and an integer variable (which are stored in memory during run-time in this order with no memory alignment padding). Object B has three properties: a pointer variable that points to a dispatch table with three function pointers, an integer variable, and a floating-point variable (which are stored in memory during run-time in this order with no memory alignment padding). An example indirect addition operation takes a memory address, an offset value, and an integer value as operands, and adds the integer value to the data that is offset from the memory address by the offset value. If the offset value is equal to the size of a pointer variable, either the memory address of object A or the memory address of object B can be the memory address operand of the indirect operation, because the integer value can be added to the value at the integer variable of either object A or object B that is offset from the memory address of each of object A or object B by the size of the pointer variable.

However, if the offset value is equal to the sum of the size a pointer variable and the size of an integer value, undesirable behavior can occur if either the memory address of object A or the memory address of object B is the memory address operand of the indirect operation. If the memory address of object B is the memory address operand, data corruption may result and integer addition is used to add the integer value to the floating-point value stored at the floating-point variable. If the memory address of object A is the memory address operand, data corruption, a memory access violation, or other undesirable behavior can occur because the memory location that is offset from the memory address of object A by the sum of the size of a pointer variable and the size of an integer value is not allocated to object A. Such undesirable behaviors are examples of security vulnerabilities.

As an example of another security vulnerability, an indirect call operation can take a memory address and an offset value as operands, and call a function that is referenced by a function pointer located at a memory location referenced by a memory address defined by a value stored at the memory address operand offset by the offset value times the size of a function pointer. That is, if the memory address operand is 0x0000a3c6, the offset value is 0x02, a function pointer is 0x04 bytes, and the value 0xffff1000 is stored during run-time at the memory location identified by memory address operand (i.e., 0x0000a3c6); the indirect call operation results in a call to a function referenced by a function pointer stored at a memory location identified by the memory address 0xffff1008, which is the result of 0xffff1000 (value stored at the memory location identified by the memory address operand)+0x02 (the offset operand)×0x04 (size of function pointer).

Accordingly, if the memory address of object B is the memory address operand and 0x02 is the offset operand, the function referenced by the third function pointer of the dispatch table referenced by object B is called. However, if the memory address of object A is the memory address operand and 0x02 is the offset operand, the memory location referenced by the indirect call operation is beyond (or outside of) object A (or the dispatch table referenced by object A). That is, for the memory address of object A as the memory address operand, an offset of 0x00 would result in a call to the function referenced by the first function pointer of the dispatch table reference by object A. Similarly, for the memory address of object A as the memory address operand, an offset of 0x01 would result in a call to the function referenced by the second function pointer of the dispatch table reference by object A. However, because there are only two function pointers at the dispatch table reference by object A, an offset of 0x02 results in the indirect call operation accessing data that is beyond (or outside) object A.

A processor executing the indirect call operation at run-time may interpret the data at the memory location referenced by the indirect call operation as a function pointer (or memory address), and attempt to execute instructions at the memory location pointed to by that data when interpreted as a memory address. This can result in memory access violations, arbitrary code execution, execution of injected code, and/or other undesirable behavior.

Such undesirable behavior can occur, for example, when a pointer to (or memory address of) an object is stored at a variable that can be modified by various operations within a software module. If a pointer to one object is stored at the variable when the indirect operation occurs, the indirect operation can have a safe (e.g., with no security vulnerabilities) result; but if a pointer to another object (e.g., an object with a different size) is stored at the variable when the indirect operation occurs, the indirect operation can have or expose a security vulnerability. Accordingly, indirect operations are identified at block 220 for further analysis at block 230.

At block 230, an object analysis system implementing process 200 determines whether an object characterized at block 210 reaches an indirect operation. In other words, the object analysis system tracks that object (e.g., using a memory address or other identifier of that object) through various code paths of the software module based on operations of the software module to determine whether code paths exist that allow the object to reach that indirect operation. For example, an object reaches an indirect operation if a memory address of that object or a memory address of a dispatch table associated with that object reaches that indirect operation.

In some implementations, that object and that indirect operations can be subjected to reaching definition analysis (RDA) to determine whether that object reaches that indirect operations. In other implementations, other data-flow analysis methodologies can be used to determine whether an object reaches an indirect operation at block 230.

If that object does not reach that indirect operation at block 230, block 230 is repeated for another object and indirect operation pair. If that object does reach that indirect operation at block 230, process 200 proceeds to block 240. At block 240, the object analysis system determines whether that indirect operation extends beyond the object. An operation extends beyond an object if the operation operates on or access memory outside of (e.g., that is not allocated to or shared by) that object. For example, object analysis system can analyze operands and the functionality of that indirect operation and one or more sizes of that object to determine whether that indirect operation will access data at a memory location that is not included within that object.

If that indirect operation does not extend beyond that object, process 200 proceeds to block 230, which is repeated for another object and indirect operation pair. If that indirect operation does extend beyond that object, process 200 proceeds to block 250 at which a potential security vulnerability is reported. In some implementations, an annotation can be made at a file or at data store such as a database to record the potential security vulnerability. In some implementations, a view of a graphical user interface (GUI) or command line interface (CLI) is updated to report the potential security vulnerability. Furthermore, the annotation or report can include a description of the potential security vulnerability and the location of the indirect operation or a description of the object for which the potential security vulnerability exists. Process 200 then proceeds to block 230, which is repeated for another object and indirect operation pair. Thus, blocks 230, 240, and/or 250 can be repeated for each object and indirect operation pair defined by objects characterized at block 210 and indirect operations identified at block 220.

Process 200 illustrated in FIG. 2 is an example implementation. Other implementations can include additional, fewer, and/or rearranged blocks or steps. For example, the order of blocks 210 and 220 can be reversed. Furthermore, in some implementations, blocks 230, 240, and/or 250 can each be performed for a group of objects and/or indirect operations. For example, rather than iterate through blocks 230, 240, and/or 250 for each object and indirect operation pair, these blocks can be executed for one object and a group of indirect objects, for a group of objects and one indirect operation, or for a group of objects and a group of indirect operations.

As yet another example, in some implementations, a potential security vulnerability can be reported for an indirect operation if multiple objects can potentially reach that indirect operation, but reaching definition analysis is unable to specifically identify which objects will reach that indirect operation during run-time execution or interpretation of the software module. For example, an indirect operation can be within a subroutine that accepts as an argument an identifier of an object (such as a memory address of the object) that is selected dynamically from a container such as an associative container during run-time. Because the object is selected at run-time, the operations described in the binary code do not define a deterministic set of objects that are operands of the indirect operation. In other words, the reaching definition analysis fails under such circumstances, and a potential security vulnerability can be reported.

Figure 3:
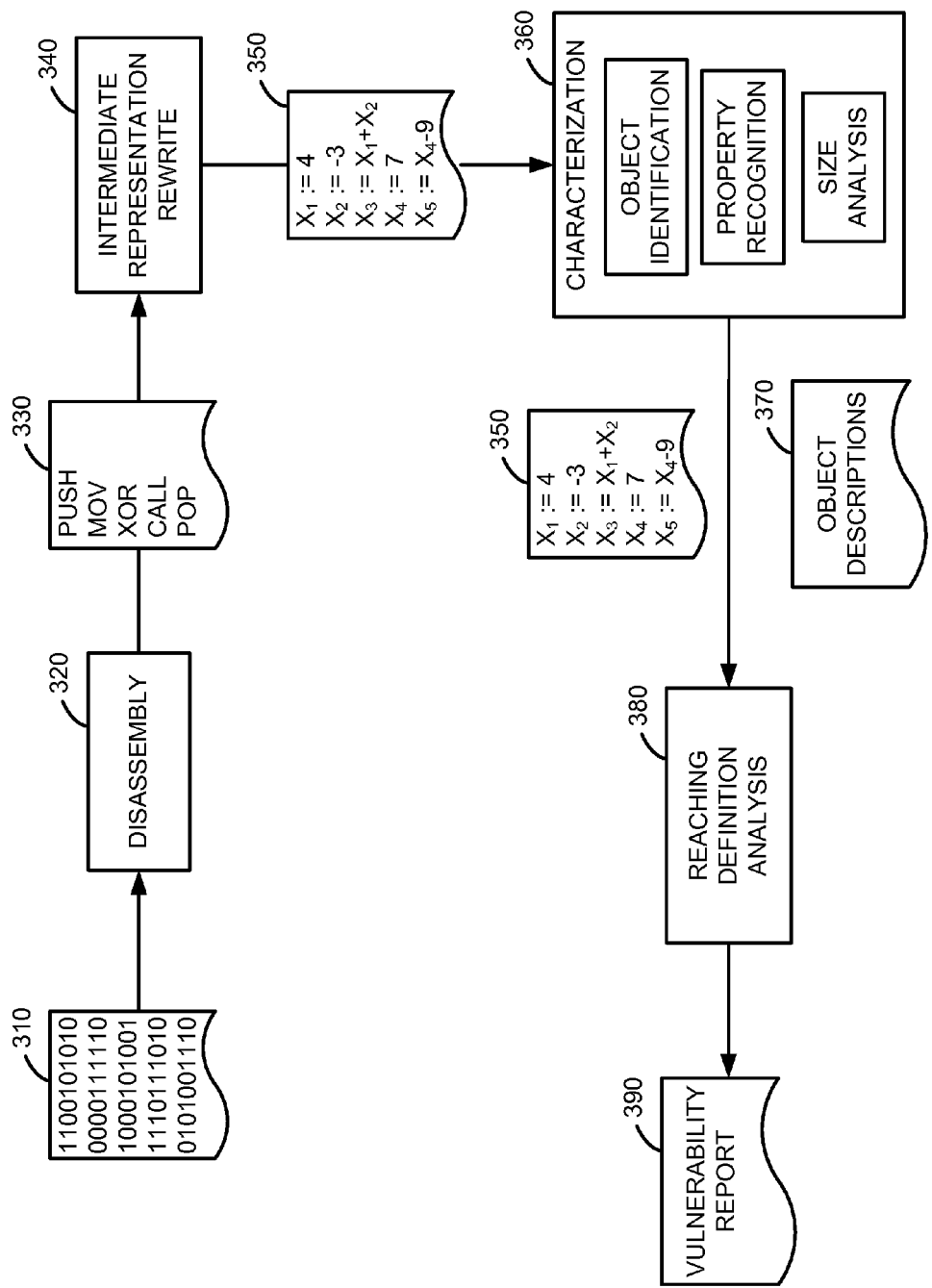
FIG. 3 is a flow diagram of a source code independent object analysis process, according to an implementation.

FIG. 3 is a flow diagram of a source code independent object analysis process, according to an implementation. Binary code 310 is a representation of a software module that is executable at a processor, and is disassembled at block 320 to generate assembly language code 330 of the software module. Said differently, binary code 310 is disassembled by, for example, a disassembler (e.g., a software module hosted at a computing system) to convert operation or machine code in binary code 310 to assembly language syntax in assembly language code 330.

Assembly language code 330 is then rewritten (or converted) to intermediate representation 350 at block 340. For example, assembly language code 330 can be converted to intermediate representation 350 by rewriting each operation expressed in assembly language code 330 as an operation or combination of operations in intermediate representation 350. In some implementations, binary code 310 is converted or rewritten to intermediate representation 350 at block 340 directly without disassembling binary code 310 to assembly language code 330. In other words, in some implementations, block 320 can be excluded.

An intermediate representation is a representation of a software module that expresses operations of the software module using a language or code that is not specific to a computing system or processor at which the software module may ultimately be executed. In other words, an intermediate representation is an abstract representation of the software module. As such, an intermediate representation is often used in software module or code compilation processes to express a software module in simple operational terms for analysis and optimization. Here, intermediate representation 350 can be useful to express the software module represented by binary code 310 and assembly language code 330 as simple operations to simplify characterization of objects within the software module at block 360. In other words, analysis of binary code 310 can be simplified by converting binary code 310 to intermediate representation 350.

As a specific example of an intermediate representation, intermediate representation 350 can be a static single assignment form (SSA) intermediate representation. An SSA intermediate representation is an intermediate representation in which each variable referenced in the intermediate representation is assigned a value exactly once. This property significantly simplifies identifying the value of a variable in operations for which that variable is an operation. Said more specifically, use-definition chains are explicit in SSA intermediate representations. As a specific example of this simplification, an identifier such as a memory address of an object is assigned to a variable within an SSA intermediate representation, and no other value will be assigned to that variable. Accordingly, use of the object in an software module can be tracked within the SSA intermediate representation of the software module by identifying operations for which that variable is an operand.

At block 360, objects within the software module represented by intermediate representation 350 are characterized. For example, as discussed above, objects can be identified, sizes of those objects can be determined, and properties of those objects recognized at block 360. The characterization at block 360 results in a group of object descriptions 370. Object descriptions 370 can include a name or other unique identifier, a size, and/or properties of the objects characterized. As a specific example, an object description for each object can include a name or label of a variable within intermediate representation 350 at which an identifier of that object is stored and a number of bytes that object and/or a dispatch table associated with that object would occupy at a memory.

A reaching definition analysis is performed at block 380 on object descriptions 370 and intermediate representation 350. The reaching definition analysis at block 380 identifies operations reached by objects characterized at block 360 and described in object descriptions 370. As a specific example, the reaching definition analysis at block 380 can determine which objects reach indirect operations. Furthermore, the reaching definition analysis can determine whether an indirect operation extends beyond an object that reaches that indirect operation based on a size of the object at object descriptions 370.

Indirect operations that extend beyond objects can be described or noted at vulnerability report 390. In other words, a description or identifier of indirect operations that extend beyond an object and a description or identifier of those objects beyond which indirect operations extend are included in vulnerability report 390.

Figure 4:
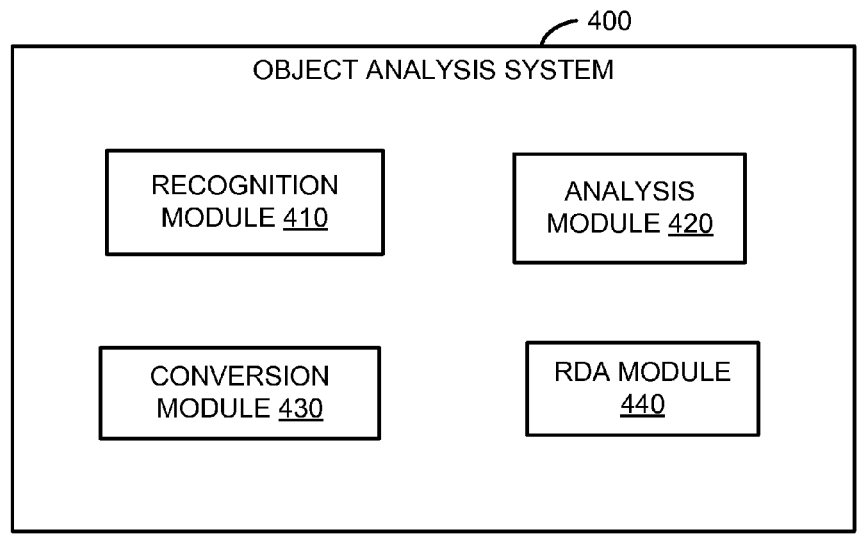
FIG. 4 is a schematic block diagram of an object analysis system, according to an implementation.

FIG. 4 is a schematic block diagram of an object analysis system, according to an implementation. Although various modules (i.e., combinations of hardware and software) are illustrated and discussed in relation to FIGS. 4 and 5 and other example implementations, other combinations or sub-combinations of modules can be included within other implementations. Said differently, although the modules illustrated in FIGS. 4 and 5 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Object analysis system 400 includes recognition module 410, analysis module 420, conversion module 430, and reaching definition analysis module (labeled "RDA module" in FIG. 4). Recognition module 410 identifies objects within a software module independent of source code of that software module. For example, recognition module 410 can identify objects by identifying instantiation of those objects in binary code (or a representation of a software module derived from binary code) as discussed, for example, in relation to FIG. 1A.

Analysis module 420 analyzes a representation of a software module such as a binary code representation or an intermediate representation (e.g., an SSA intermediate representation) to determine a size of objects identified at recognition module 410. The size of an object can be any of a variety of sizes of that object. For example, the size of the object can be the number of bytes occupied by that object in a memory during run-time of the software module, the number of function pointers at a dispatch table of that object, or the number of bytes occupied by a dispatch table of that object in a memory during run-time of the software module. Furthermore, analysis module 420 can implement methodologies discussed, for example, in relation to FIG. 1A to determine a size of an object.

Conversion module 430 converts a binary code representation of a software module to another representation that is accessed by, for example, recognition module 410, analysis module 420, and/or reaching definition analysis module 440. In other words, in some implementations, conversion module 430 generates a representation of a software module from binary code, and other modules object analysis system 400 access that representation to analyze a software module. As a specific example, conversion module 430 can include a disassembler and SSA intermediate representation rewriter. The disassembler converts binary code to assembly language code, and the SSA intermediate representation rewriter converts that assembly language code into an SSA intermediate representation. The SSA intermediate representation can then be accessed by one or more of module 410, analysis module 420, and reaching definition analysis module 440. In some implementations, some of module 410, analysis module 420, and reaching definition analysis module 440 access one representation of a software module (e.g., a binary code representation or assembly language representation), and others of module 410, analysis module 420, and reaching definition analysis module 440 access a different representation of the software module (e.g., an SSA intermediate representation generated from a binary code representation of the software module).

Reaching definition analysis module 440 performs a reaching definition analysis on a representation of a software module. More specifically, reaching definition analysis module 440 performs a reaching definition analysis to determine which objects identified at recognition module 410 reach indirect operations of the software module.

In some implementations, reaching definition analysis module 440 also determines whether indirect operations reached by objects identified at recognition module 410 extend beyond those objects. For example, analysis module 420 can provide a size of those objects to reaching definition analysis module 440, and reaching definition analysis module 440 can determine whether those indirect operations extend beyond any of those objects. More specifically, for example, reaching definition analysis module 440 can determine whether the indirect operations reached by objects would access memory not allocated to or shared by those objects during run-time of the software module based on the functionality of those indirect operations, operands of those indirect operations, and/or sizes of those objects.

Figure 5:
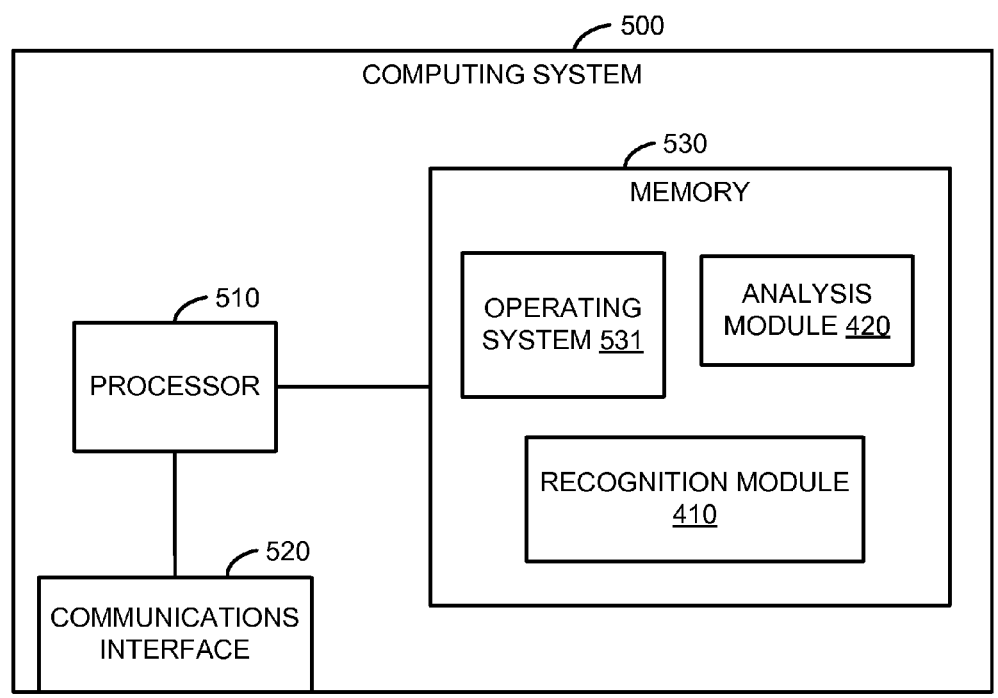
FIG. 5 is a schematic block diagram of a computing system hosting an object analysis system, according to an implementation.

FIG. 5 is a schematic block diagram of a computing system hosting an object analysis system, according to an implementation. In the example illustrated in FIG. 5, computing system 500 includes processor 510, communications interface 520, and memory 530, and hosts operating system 531, recognition module 410, and analysis module 420.

Processor 510 is any combination of hardware and software that executes or interprets instructions, codes, or signals. For example, processor 510 can be a microprocessor, an application-specific integrated circuit (ASIC), a distributed processor such as a cluster or network of processors or computing systems, a multi-core or multi-processor processor, or a virtual or logical processor of a virtual machine.

Communications interface 520 is a module via which processor 510 can communicate with other processors or computing systems via communications link. For example, computing system 500 can report security vulnerabilities to an electronic mailbox or instant messaging service via a communications link using communications interface 520. For example, communications interface 520 can include a network interface card and a communications protocol stack hosted at processor 510 (e.g., instructions or code stored at memory 530 and executed or interpreted at processor 510 to implement a network protocol). As specific examples, communications interface 520 can be a wired interface, a wireless interface, an Ethernet interface, a Fiber Channel interface, an InfiniBand interface, and IEEE 802.11 interface, or some other communications interface via which processor 510 can exchange signals or symbols representing data to communicate with other processors or computing systems.

Memory 530 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 530 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. Said differently, memory 530 can represented multiple processor-readable media. In some implementations, memory 530 can be integrated with processor 510, separate from processor 510, or external to computing system 500.

Memory 530 includes instructions or codes that when executed at processor 510 implement operating system 531, recognition module 410, and analysis module 420. In other words, operating system 531 and an object analysis system including recognition module 410, and analysis module 420 are hosted at computing system 500.

In some implementations, computing system 500 can be a virtualized computing system. For example, computing system 500 can be hosted as a virtual machine at a computing server. Moreover, in some implementations, computing system 500 can be a virtualized computing appliance, and operating system 531 is a minimal or just-enough operating system to support (e.g., provide services such as a communications protocol stack and access to components of computing system 500 such as communications interface 520) recognition module 410 and analysis module 420.

Recognition module 410 and analysis module 420 can be accessed or installed at computing system 500 from a variety of memories or processor-readable media. For example, computing system 500 can access Recognition module 410 and analysis module 420 at a remote processor-readable medium via communications interface 520. As a specific example, computing system 500 can be a thin client that accesses operating system 531, recognition module 410, and analysis module 420 during a boot sequence.

As another example, computing system 500 can include (not illustrated in FIG. 5) a processor-readable medium access device (e.g., CD, DVD, SD, MMC, or a CF drive or reader), and can access recognition module 410 and analysis module 420 at a processor-readable medium via that processor-readable medium access device. As a more specific example, the processor-readable medium access device can be a DVD drive at which a DVD including an installation package for one or more of recognition module 410 and analysis module 420 is accessible. The installation package can be executed or interpreted at processor 510 to install one or more of recognition module 410 and analysis module 420 at computing system 500 (e.g., at memory 530). Computing system 500 can then host or execute recognition module 410 and analysis module 420.

In some implementations, recognition module 410 and analysis module 420 can be accessed at or installed from multiple sources, locations, or resources. For example, some components of recognition module 410 and analysis module 420 can be installed via a communications link, and other components of recognition module 410 and analysis module 420 can be installed from a DVD.

In other implementations, recognition module 410 and analysis module 420 can be distributed across multiple computing systems. That is, some components of recognition module 410 and analysis module 420 can be hosted at one computing system and other components of recognition module 410 and analysis module 420 can be hosted at another computing system. As a specific example, recognition module 410 and analysis module 420 can be hosted within a cluster of computing systems where each of recognition module 410 and analysis module 420 is hosted at multiple computing systems, and no single computing system hosts each of recognition module 410 and analysis module 420.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes.

What is claimed is:

1. A non-transitory processor-readable medium storing code representing instructions that when executed at a processor cause the processor to:
    identify, during a static analysis independent of source code of a software module, an object within the software module and an indirect operation within the software module, wherein the indirect operation stores data unrelated to the object; and
    determine, during the static analysis independent of source code of the software module, a size of the object based on an amount of memory allocated to the object of at least one operation within the software module.

2. The processor-readable medium of claim 1, wherein the size is a size of a dispatch table associated with the object.

3. The processor-readable medium of claim 1, wherein the object is identified based on a reference to a dispatch table.

4. The processor-readable medium of claim 1, further comprising code representing instructions that when executed at the processor cause the processor to:
    identify instantiation of the object based on at least one operation within the software module, the object is identified based on the identified instantiation of the object.

5. The processor-readable medium of claim 1, further comprising code representing instructions that when executed at the processor cause the processor to:
    determine whether the object reaches the indirect operation; and
    determine whether the indirect operation extends beyond the object based on the size.

6. The processor-readable medium of claim 1, further comprising code representing instructions that when executed at the processor cause the processor to:
    determine whether the object reaches the indirect operation; and
    determine whether the indirect operation extends beyond a dispatch table of the object based on the size.

7. The processor-readable medium of claim 1, wherein the software module is represented in a static single assignment form.

8. The processor-readable medium of claim 1, wherein the at least one operation includes at least one of a data access operation not associated with the object, a data store operation for data other than a function pointer, or a zero padding operation.

9. A non-transitory processor-readable medium storing code representing instructions that when executed at a processor cause the processor to:
    characterize, independent of source code of a software module, a plurality of objects within the software module, wherein, for each object from the plurality of objects, characterizing the plurality of objects includes identifying instantiation of that object and determining a size of that object based on an amount of memory allocated to the object of at least one operation within the software module;
    identify, independent of source code of a software module, a plurality of indirect operations within the software module, wherein the plurality of indirect operations store data unrelated to the object; and
    determine, based on a static single assignment form representation of the software module, whether each object from the plurality of objects reaches each indirect operation from the plurality of indirect operations.

10. The processor-readable medium of claim 9, further comprising code representing instructions that when executed at the processor cause the processor to:
    determine whether an indirect operation from that plurality of indirect operations that is reached by an object from the plurality of objects extends beyond that object.

11. The processor-readable medium of claim 9, further comprising code representing instructions that when executed at the processor cause the processor to:
    determine whether an indirect operation from that plurality of indirect operations that is reached by an object from the plurality of objects extends beyond a dispatch table of that object.

12. The processor-readable medium of claim 9, further comprising code representing instructions that when executed at the processor cause the processor to:
    convert a binary representation of the software module to the static single assignment form representation.

13. The processor-readable medium of claim 9, wherein, for each object from the plurality of objects, characterizing the plurality of objects includes identifying instantiation of that object and determining a size of a dispatch table associated with that object.

14. The processor-readable medium of claim 9, wherein, for each object from the plurality of objects, characterizing the plurality of objects includes identifying instantiation of that object and determining a size of that object based on at least one of a data access operation not associated with the object, a data store operation for data other than a function pointer, or a zero padding operation within the software module.

15. The processor-readable medium of claim 9, wherein, for each object from the plurality of objects, characterizing the plurality of objects includes identifying properties of that object.

16. An object analysis system, comprising:
    a recognition module to identify a plurality of objects within a software module and a plurality of indirect operations within the software module based on a static single assignment form representation of the software module, wherein the plurality of indirect operations store data unrelated to the object; and
    an analysis module to determine, based on the static single assignment form representation of the software module, a size of each object from the plurality of objects based on an amount of memory allocated to each object of at least one operation within the software module.

17. The system of claim 16, further comprising:
a conversion module to convert a binary representation of the software module to the static single assignment form representation of the software module.

18. The system of claim 16, further comprising:
a reaching definition analysis module to determine whether each object from the plurality of objects reaches an indirect operation within the software module.

19. The system of claim 16, wherein the recognition module identifies the plurality objects by identifying an instantiation of each object from the plurality of objects.

* * * * *